April 8, 1958

E. E. BEDELL

FACSIMILE STYLUS HOLDER 2,829,942

Filed May 17, 1956

2 Sheets-Sheet 1

INVENTOR.
E. E. BEDELL

BY [signature]

ATTORNEY

April 8, 1958

E. E. BEDELL 2,829,942

FACSIMILE STYLUS HOLDER

Filed May 17, 1956

2 Sheets-Sheet 2

INVENTOR.
E. E. BEDELL

BY [signature]

ATTORNEY

United States Patent Office 2,829,942
Patented Apr. 8, 1958

2,829,942

FACSIMILE STYLUS HOLDER

Elmer E. Bedell, Southampton, N. Y., assignor to The Western Union Telegraph Company, New York, N. Y., a corporation of New York Application May 17, 1956, Serial No. 585,546

7 Claims. (Cl. 346—139)

This invention relates to a facsimile stylus holder assembly, and more particularly to a stylus assembly for holding a replaceable electrical recording stylus in proper adjusted position in a facsimile machine.

Facsimile machines of the type adapted to be placed on an office desk or table in a customer's premises are necessarily made relatively small and compact, notwithstanding that they commonly are transceivers which embody both transmitting and recording mechanisms, such as shown in United States Patent No. 2,718,547 of Wise et al., issued September 20, 1955. Such transceivers have two scanning mechanisms associated with a single rotatable drum; the scanning mechanism used for transmitting preferably is of the optical type, and the recording is effected on a recording sheet by an electrical stylus to which the incoming signals are applied. A stylus commonly is composed of a relatively short length of steel or tungsten wire having a diameter of .008" to .010", and as the recording point of the stylus wears down in service this requires replacement by a new stylus. Due to the small size of the stylus and the nature of the stylus holders heretofore employed, it has been a tedious and time consuming task to replace a worn stylus, and one which the customer ordinarily could not perform, so that the need for a stylus replacement would sometimes keep the customer's machine out of service until a maintenance man could be sent out from the telegraph office or other location.

In accordance with the instant invention, the recording stylus is held in a simple inexpensive and easily constructed holder device which is readily removable from an associated stylus mounting member in order to replace a worn stylus and to insert a new stylus assembly without difficulty. In one embodiment of the invention the stylus holder is of a disposable type and when the stylus holder is replaced by the insertion of a new holder and new stylus secured thereto, the former holder and stylus are discarded. In another form of the invention the stylus holder has clamping means and may easily be reloaded with a new stylus, and in still another form a relatively long stylus may be inserted, adjusted and/or replaced and resiliently clamped by the stylus holder.

Among the objects of the invention are the provision of a stylus holder which is simple and inexpensive; which may quickly and easily be inserted in or removed from the associated stylus-mounting structure without the aid of tools; a stylus holder which is self-aligning in the stylus-mounting structure in order to properly position the stylus for a recording operation; and a stylus holder that enables a clerk or other attendant in a customer's office readily to change out a worn stylus.

Other objects and advantages will be apparent from the following detailed description of several embodiments thereof, taken in connection with the accompanying drawings in which.

Figure 1:
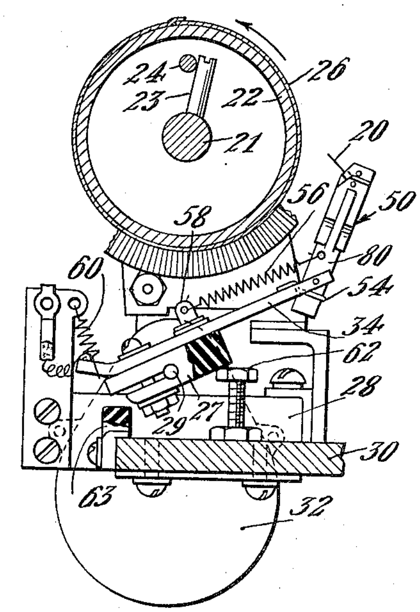
Fig. 1 is a side view of stylus mounting and control mechanism in a facsimile transceiver, showing the improved stylus holder inserted in the stylus mounting mechanism, with the stylus retracted from its recording position.

Referring now to Fig. 1 of the drawings, the facsimile transceiver above referred to embodies a metal scanning drum 22 which is slidably supported on a shaft 21. The drum is free to turn on the shaft for approximately one revolution and is connected thereto by a radial pin 23 secured into the shaft inside the drum. A rod 24 is supported inside the drum and parallel to the shaft 21, and when the pin 23 strikes the rod 24 the drum becomes coupled to the shaft for rotation at scanning speed, as described in the aforesaid Wise Patent 2,718,547. The reason why the drum is free to rotate on shaft 21 for almost a full turn is to permit a rotary adjustment of the drum by the attendant for easier mounting of a blank 26 in proper position. The sheet 26, referred to as a blank, may comprise either a message copy for transmission or an electrosensitive blank for recording. When a recording operation is desired, a recording stylus 20 is moved into contact with the recording surface of the blank; in the position shown in Fig. 1 the recording stylus has been moved back out of recording position.

The drum shaft 21 is driven by a synchronous motor 32 which, through suitable gearing, rotates the drum shaft 21 at a suitable speed, for example, 180 R. P. M., during a scanning operation. Rotation of the drum is accompanied by a slow feeding of the drum along the shaft 21 to effect line feed in the scanning operation in a manner described in the foregoing patent and also well known in the art.

An upstanding angle bracket 28 is secured to the base 30 of a casting; the synchronous motor 32 is suitably fastened to the bracket 28. A split block 27 of insulating material is rigidly clamped to a shaft 29 driven by the motor, and a conductive arm 34 is mounted on the block. The arm 34 extends rearward in a plane normal to the drum shaft 21 and the rear end 36 of this arm is bifurcated, as seen more clearly in Fig. 2. The forked end 36 carries a pin 38 on which is pivoted a strip 40 of spring metal, for example, steel or Phosphor bronze, to provide stylus-mounting structure. The strip 40 is formed at its free end with divergent opposed mounting members, such as a central prong 42 and a pair of side prongs 44 which have bent tips or offsets 46.

Figures 2, 5:
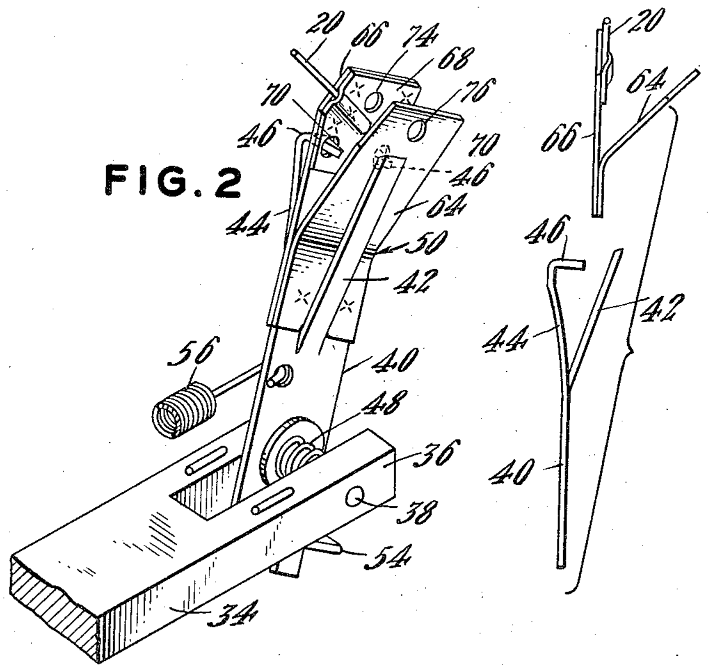
Fig. 2 is an enlarged perspective view of a portion of the stylus mounting and control mechanism.
Fig. 5 is a view similar to Fig. 4 with the stylus holder removed from the associated mounting member.

The member 40 is held against side play of the pivot pin 38 by an expanding coil spring 48. A U-shaped wire spring 54 carried by the forked end 36 of arm 34 acts as a cushioning stop to limit the forward swing (leftwise as seen in Figs. 1 and 2) of the stylus-mounting member 40 under the pulling action of a spring 56 which is attached at one end to the member 40 and at the other end to a lug 58 on the arm 34. The spring 56 holds the connected members 34 and 40 out of line, so that they constitute a toggle joint.

A contractile spring 60 is connected to a forward extension of arm 34 and constantly tends to rock the arm downward (clockwise as viewed in Figs. 1 and 2). Normally the spring 60 holds the stylus-mounting structure in withdrawn position, as seen in Fig. 1, with the insulating block 27 engaging an adjustable stop screw 62. While the spring 56 tends to rock the pivoted mounting structure toward the drum, the resilient stop 54 limits this forward movement to keep the recording stylus 20 at the proper distance from the drum. In its retracted position, the stylus 20 does not interfere with the operation of the machine as a transmitter.

When the motor 32 is energized for a recording operation, the motor shaft 29 swings the toggle-jointed members 34 and 40 upward very slowly until the block 27 strikes an insulating stop 63. However, shortly before the block encounters the fixed stop 63, the stylus 20 engages the recording blank 26, so that the continued upward movement of the arm 34 to final position causes the member 40 to rock about its pivot 38 until the block 27 hits the stop 63. At that moment the energized motor 32 stalls and continues to exert a torque on the arm 34, thereby maintaining the stylus point in constant pressure contact with the surface of the scanned sheet 26. The stylus pressure is determined by the strength of the tensioned spring 56 and is very small.

The motor 32 is kept energized during the entire recording operation, so that the shaft 29 constantly tends to turn forward (leftwise as viewed in Fig. 1) thereby keeping the block 27 firmly against the stop 63. This keeps the spring 56 under tension to hold the stylus point against the paper with a uniform recording pressure. Due to the slow turning of the motor shaft 29 (for example, from 1 to about 10 R. P. M.) the stylus 20 is brought into contact with the paper by the stylus point. When the motor 32 is deenergized, a tensioned spring 60 instantly rocks the stylus-mounting structure downward until the block 27 strikes the stop 62.

Figure 3:
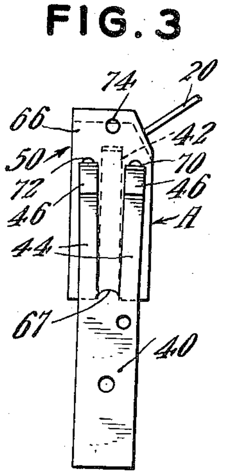
Fig. 3 is a side view of the stylus holder and mounting member for the stylus holder removed from the associated mounting and control mechanism of Fig. 2.
Figure 4:
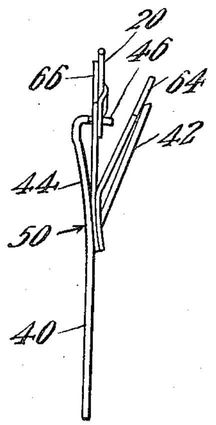
Fig. 4 is a front view of Fig. 3, looking at the recording end of the stylus, and in the direction of the arrow A in Fig. 3.
Figure 6:
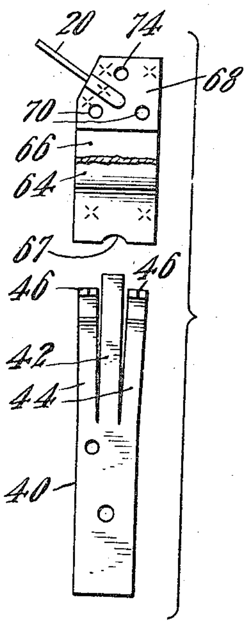
Fig. 6 is a side view of Fig. 5.
Figure 7:
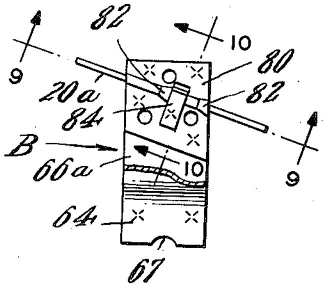
Fig. 7 is a view, partly broken away, of another form of stylus holder adapted to hold a relatively long stylus.

Figs. 2 to 6 show details of a disposable type of stylus holder constructed in accordance with the instant invention. Figs. 2, 3 and 4 show the stylus holder inserted in the stylus-mounting member 40, and Figs. 5 and 6 show the stylus holder withdrawn from the stylus mounting member.

The stylus holder, generally indicated at 50 in Figs. 1 and 2, comprises a spring device composed of a bent strip or arm 64 of spring metal, such as steel or Phosphor bronze, the lower end of which is secured, as by welding, to the lower end of a straight arm or strip 66 which preferably, although not necessarily, is also composed of spring metal, the spot welds being indicated by small crosses seen in Figs. 2 and 6. The upper end of the strip 66 has secured thereto, as by spot welding, a small plate 68 which is formed to provide a tubular aperture into which the rear end of the stylus 20 is inserted, the stylus being permanently secured in the aperture, as by a spot weld indicated by the small cross on top of the formed tube. A pair of holes 70 are drilled through the plate 68 and upper end of the strip 66, which holes are adapted to receive the bent tips 46 of the prongs 44 of the mounting strip 40, so that the resilient stylus holder will be properly secured by the bent tips 46 and the central prong 42 of the member 40. As seen in Fig. 2 the ends of the tips 46 may be tapered, if desired, to facilitate their entry in the holes 70. In order to insert the stylus holder in the mounting strip 40 it is only necessary for the attendant to grasp the free ends of the arms of the stylus holder between the thumb and forefinger of one hand and squeeze or press the spring arm 64 towards the arm 66, and then slide the stylus holder between the central prong 42 and the side prongs 44 until the bent tips 46 enter the holes 70, the stylus holder firmly engaging the members 42 and 44 due to the spring force acting outwardly on the arms 64 and 66. Holes 74 and 76 preferably are drilled in the upper ends of the strip 66 and plate 68 and strip 64 to provide means for obtaining a firm grasp of the stylus holder by the thumb and forefinger. The lower end of the stylus holder preferably is notched, as seen in 67 in Fig. 6; the notched portion is adapted to engage the lower end of the central prong 42. The notched portion 67 and holes 70 of the holder coact with the bent tips 46 and base of the prong 42 to locate and lock the stylus holder in proper recording position.

In order to change out a stylus, it is only necessary to squeeze or otherwise flex the upper ends of the divergent arms towards each other sufficiently to release the holder 50 from the bent tips 46, after which the stylus holder can be withdrawn and discarded, and a new stylus holder and stylus inserted. The operation requires but a few seconds of time on the part of the attendant or other person. It will be understood that when both arms are composed of spring metal, the free end of each will be flexed when the ends are squeezed towards each other by the attendant. The distance between the free ends of the divergent arms of the stylus holder before its insertion is greater than that between the opposed ends of the divergent tines comprising the mounting members, so that after insertion the spring force exerted outwardly by the flexed arms will cause them to firmly engage the mounting tines and prevent any loose play in service.

Figs. 7 to 10 show a modified stylus holder adapted to receive a long stylus **20*a*. In this structure, clamping plates 78 and 80 are secured to each other and to the upper end of the arm or strip 66*a*, as by spot welding. The upper clamping plate 80 is formed to provide a tube for receiving the stylus 20*a*, the plate also having funnel-shaped orifices as indicated at 82 to facilitate insertion and guiding of the stylus in the tube. The plate 80 has secured thereto, as by spot welding, a flexible spring member 84 which is received within a slot in the plate 80 and applies resilient tension on the stylus to hold it firmly in proper recording position. In this modification the stylus may be advanced as the recording point wears down, and the stylus holder is not discarded in order to change out a stylus since a worn stylus may readily be withdrawn and a new stylus inserted in the tubular portion of plate 80. Ordinarily, it will be found easier to press or squeeze the spring arm 64 towards the arm 66*a* and withdraw the stylus holder assembly from the mounting member 40** before the stylus is changed out.

Figure 11:
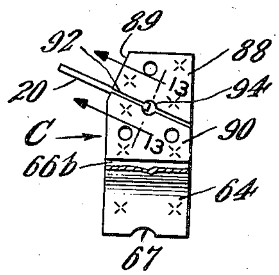
Fig. 11 is a view, partly broken away, of still another form of stylus holder.
Figure 8:
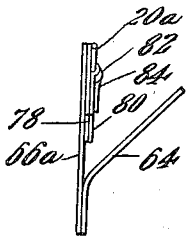
Fig. 8 is a front view of the holder of Fig. 7 looking in the direction of the arrow B in the latter figure.
Figure 12:
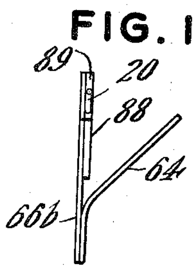
Fig. 12 is a front view of Fig. 11 looking in the direction of the arrow C in the latter figure.
Figure 13:
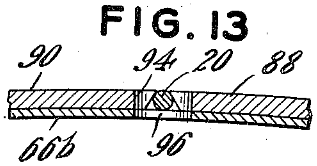
Fig. 13 is an enlarged sectional view taken along the line 13—13 of Fig. 11.
Figure 9:
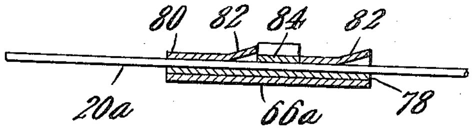
Fig. 9 is an enlarged sectional view taken along the line 9—9 of Fig. 7.
Figure 14:
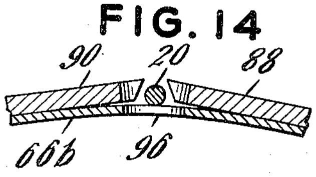
Fig. 14 shows the stylus holder of Fig. 13 when bent in its stylus-releasing position.
Figure 15:
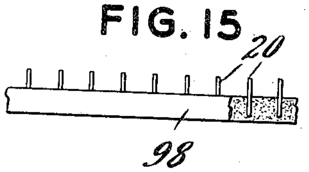
Fig. 15 shows a plurality of short styli in a magazine or carrier strip therefor.
Figure 10:
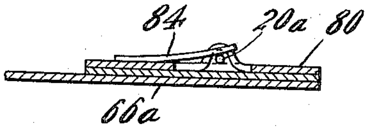
Fig. 10 is an enlarged sectional view taken along the line 10—10 of Fig. 7.

Figs. 11 to 14 disclose a third modification in which the arm or strip **66*b* of the holder has secured thereto, as by spot welding, two plate members 88 and 90, which are positioned relative to each other as to form a slot 92, Fig. 11, the slot being smaller in diameter than the stylus 20. The strip 66*b* is formed from spring metal, and when it is manually flexed downwardly, as seen in Fig. 14, the adjacent edges of plates 88 and 90 are opened up to provide ample room for the insertion of a stylus, and when the flexing force is removed from 66*b* it assumes its normal straight line position so that the adjoining edges clamp tightly on to the stylus, the adjacent edges of the plates being tapered to facilitate the clamping action. A hole 94, Fig. 11, is drilled through the adjacent edges of members 88 and 90, and a corresponding hole 96, Figs. 13 and 14, is drilled in the strip 66*b***, so that the proper stopping point of the rear end of the stylus may be seen, Fig. 11, when the stylus is inserted, the stylus being inserted from the left as viewed in Fig. 11. The assembly comprising 66b and the plates 88 and 90 has a slanting edge portion 89, and this enables a new stylus readily to be inserted from a magazine 98, seen in Fig. 15, which magazine holds a plurality of styli with a predetermined length thereof extending from the edge of the magazine. A magazine may comprise two layers of adhesive tape, for example, Scotch tape, and this obviates the difficulty of handling the small styli. The magazine 98 may be used to insert a stylus 20 into the aperture formed by the adjacent edges of members 88 and 90 when flexed, as seen in Fig. 14, until the edge of the magazine engages the slanting edge 89 of the stylus holder, and when the flexing force is removed from the member 66b the stylus is firmly gripped with the proper length thereof extending from the stylus holder, whereupon the magazine may be pulled away from the inserted stylus. The arrangement prevents the small styli from being dropped or lost, and also enables a stylus readily to be inserted to the proper depth in the holder. As above mentioned, the depth to which the stylus is inserted may also be checked by viewing the inner end thereof through the openings 94 and 96; the proper depth is indicated when the inner end of the stylus appears at the center of the openings or indexing means.

Although the present invention has been described with reference to three specific embodiments thereof, it is understood that these are not to be considered as limiting the scope of the invention as defined by the appended claims.

What is claimed is:

1. In a facsimile machine having stylus mounting structure including at least two metallic tine members having opposed ends spaced from each other, a readily insertable and removable stylus holder comprising a pair of metallic arms secured together at one end thereof and having opposed free ends, means carried by the free end of one of said arms for holding a recording stylus, at least one of said arms being composed of spring metal and having its free end laterally spaced from the free end of the other arm a distance greater than that between said opposed ends of the tine members, said spring metal arm being manually flexural towards the other arm to enable the stylus holder to be inserted between the opposed tine members and operative to exert a spring force acting outwardly on the arms to hold the arms respectively in engagement with said tine members, at least one of said tine members and arms having complemental projecting and apertured portions for locating and locking the stylus holder in proper recording position.

2. Structure according to claim 1, in which one of said tine members has a tip portion and one of the arms of the stylus holder has an aperture therein for receiving said tip portion to locate and lock the stylus holder in proper recording position.

3. In a facsimile machine having stylus mounting structure including at least two divergent tine members joined together at one end thereof and having opposed ends spaced from each other, a readily insertable and removable stylus holder comprising a pair of divergent metallic arms secured together at one end thereof and having opposed free ends, means carried by the free end of one of said arms for holding a recording stylus, at least one of said divergent arms being composed of spring metal and having its free end laterally spaced from the free end of the other arm a distance greater than that between said opposed ends of the tine members, said spring metal arm being manually flexural towards the other arm to enable the stylus holder to be inserted between said divergent tine members and operative to exert a spring force acting outwardly on the arms to hold the arms respectively in engagement with said tine members, at least one of said tine members and arms respectively having coacting means for locating and locking the stylus holder in proper recording position.

4. Structure according to claim 3, in which the joined ends of said divergent tine members are operative to engage the lower end of the stylus holder to locate the same when inserted between the tine members, and at least one of said tine members and arms respectively have coacting means for locating the upper part of the stylus holder and locking the holder in proper recording position.

5. A facsimile scanning stylus holder comprising a flat strip of spring metal, a pair of plate members secured to the surface of one end of the strip and having adjacent edges spaced from each other to form a narrow slot for receiving and holding a recording stylus, the spacing between said adjacent edges being such that when said flat strip is manually flexed in an arcuate direction to further separate said adjacent edges the stylus may be inserted in the slot and when the flexing force is removed the slot will become sufficiently narrow to cause the stylus to be firmly clamped by said adjacent edges.

6. A stylus holder in accordance with claim 5, in which the adjacent edges of said plate members are tapered in a direction to exert a component of force acting downwardly on the stylus for clamping the same in the holder.

7. A stylus holder in accordance with claim 5, in which the adjacent edges forming the slot have a transversely extending aperture therein to provide an index means for determining when the stylus has been inserted to the proper distance in the slot.

References Cited in the file of this patent

UNITED STATES PATENTS

| | | |
|---|---|---|
| 1,887,186 | Pearce | Nov. 8, 1932 |
| 2,568,306 | Stamper | Sept. 18, 1951 |
| 2,718,547 | Wise et al. | Sept. 20, 1955 |